United States Patent [19]

Johnson

[11] 4,456,571
[45] Jun. 26, 1984

[54] PROCESS AND APPARATUS FOR FORMING A COMPOSITE FOAMED POLYMERIC SHEET STRUCTURE HAVING COMPARATIVELY HIGH DENSITY SKIN LAYERS AND A COMPARATIVELY LOW DENSITY CORE LAYER

[75] Inventor: David E. Johnson, Canandaigua, N.Y.

[73] Assignee: Mobil Oil Corporation, New York, N.Y.

[21] Appl. No.: 449,126

[22] Filed: Dec. 13, 1982

[51] Int. Cl.³ .................. B29D 27/00; B29F 3/08
[52] U.S. Cl. .................. 264/45.5; 264/46.1; 264/50; 264/53; 264/DIG. 5; 425/4 C; 425/325; 425/817 C
[58] Field of Search .......... 264/45.5, 48, 46.1, 264/51, 53, 50, DIG. 5; 425/817 C, 4 C, 325

[56] References Cited

U.S. PATENT DOCUMENTS

| | | | |
|---|---|---|---|
| 2,893,877 | 7/1958 | Nickolls | 264/48 X |
| 3,299,192 | 1/1967 | Lux | 264/48 |
| 3,431,164 | 3/1969 | Gilbert | 264/53 X |
| 3,444,036 | 5/1969 | Russell et al. | 264/53 X |
| 3,459,274 | 8/1969 | MacPhail, Sr. | 264/48 X |
| 3,810,965 | 5/1974 | Sen et al. | 264/48 X |
| 3,864,444 | 2/1975 | Johnson | 264/48 |
| 3,900,544 | 8/1975 | Johnson et al. | 264/45.5 |
| 4,017,245 | 4/1977 | Lang | 264/45.5 X |
| 4,071,591 | 1/1978 | Kobayashi et al. | 264/45.5 X |
| 4,128,369 | 12/1978 | Kemerer et al. | 264/46.1 X |
| 4,154,785 | 5/1979 | Inui et al. | 264/45.5 |
| 4,290,248 | 9/1981 | Kemerer et al. | 264/46.1 X |

Primary Examiner—Philip E. Anderson
Attorney, Agent, or Firm—A. J. McKillop; M. G. Gilman; James F. Powers, Jr.

[57] ABSTRACT

A method and apparatus for producing a foamed polymeric sheet having comparatively high density skin layers. Molten polymer containing a foaming agent is extruded from a die into a post-extrusion region defined by the die and a spaced pair of rotating chill rolls which are spaced from the die. The post-extrusion region is maintained at a pressure sufficient to at least inhibit expansion of the foamable molten polymer through the use of cooled sealing elements which occupy a substantial portion of the space between the die and the chill rolls, and are spaced from the chill rolls. The rolls and the sealing elements are cooled so that foamable molten polymer in the space between the sealing elements and the rolls becomes solidified, completing the seal. The chill rolls are maintained at a temperature below the temperature of the molten polymer to aid the skin formation on the surfaces of the polymer. If desired, the polymer can pass directly from the chill rolls into a water bath.

6 Claims, 3 Drawing Figures

PROCESS AND APPARATUS FOR FORMING A COMPOSITE FOAMED POLYMERIC SHEET STRUCTURE HAVING COMPARATIVELY HIGH DENSITY SKIN LAYERS AND A COMPARATIVELY LOW DENSITY CORE LAYER

BACKGROUND OF THE INVENTION

This invention relates to the production of a thermoplastic polymer structure having comparatively high density skin layers and a comparatively low density core layer. In particular, it relates to a method and apparatus for forming a polystyrene sheet structure having comparatively high density skin layers and a comparatively low density core layer.

It is known to produce polystyrene foam structures which have a comparatively low core density in relation to comparatively high skin layer densities. See, for example, U.S. Pat. Nos. 3,864,444 and 3,299,192.

U.S. Pat. No. 3,299,192 (Lux) states that the rigidity, liquid handling, and thermal insulation capability of foamed plastic pipe is enhanced by quench chilling the internal and external walls of a tube within a short time after it immerges from an extrusion die. The patent notes that such chilling produces a impervious and non-porous internal and external skin on the pipe. The patent teaches that the inner skin might be made to five times as thick as the outer skin for purposes of carrying liquids, such as water. The disclosure suggests coolant temperatures of 0° to 80° F. The examples recite the use of 70° F. air as a coolant, blasted from a nozzle upon the extrudate surfaces. Such chilling produces a pipe having a core representing 50-94% of the thickness of the pipe, the interior and exterior skins representing the balance of the pipe thickness.

It is an object of the present invention to present a process for the production of foam polymer sheet having high density skin layers and a low density core.

A further object of the invention is to present an apparatus capable of forming such a polymeric structure.

SUMMARY OF THE INVENTION

The present invention is directed to a method comprising extruding a molten polymer containing a foaming agent therein through a slot die and between, into contact with and through two spaced rotating chill rolls maintained at a temperature below the solidification temperature of said polymer so as to form a polymeric sheet structure having comparatively high density skin layers and a comparatively low density core layer.

In a preferred process of the present invention, the molten polymer containing a foaming agent is extruded through a slot die into a post-extrusion region which is maintained at a pressure sufficiently high to at least inhibit expansion of the foaming agent. The extruded polymer is then transported between, into contact with and through two spaced rotating chill rolls. The chill roll surfaces are maintained at a temperature lower than the solidification temperature of the polymer. The solidified polymer is then transported from between the chill rolls to a region of lower pressure.

The invention is also directed to a system for producing a polymeric film structure having comparatively high density skin layers and a comparatively low density core layer. The apparatus comprises in combination:

(a) extruder means for transporting molten resin under pressure from a feed point to a slot die discharge point;

(b) a pair of spaced driven chill rolls in association with said slot die and adapted to receive extruded molten foaming agent-containing polymer therebetween and in contact therewith;

(c) means in association with said slot die chill rolls and extruded polymer to at least substantially pressure-seal the region between said slot die and chill rolls and permit a back-pressure to develop therein; and (d) means for maintaining said chill rolls at a temperature below said molten polymer. This system can include a means for maintaining at least the spaced region of said chill rolls in contact with water which is maintained at a temperature below the solidification point of said extruded polymer.

The invention is also directed to the production of a thermoplastic polymeric sheet structure comprising a low density foam core having high density skin layers, the cells of said core being elongated and oriented at least generally normal to said skins.

DETAILED DESCRIPTION OF THE INVENTION

Figure 1:
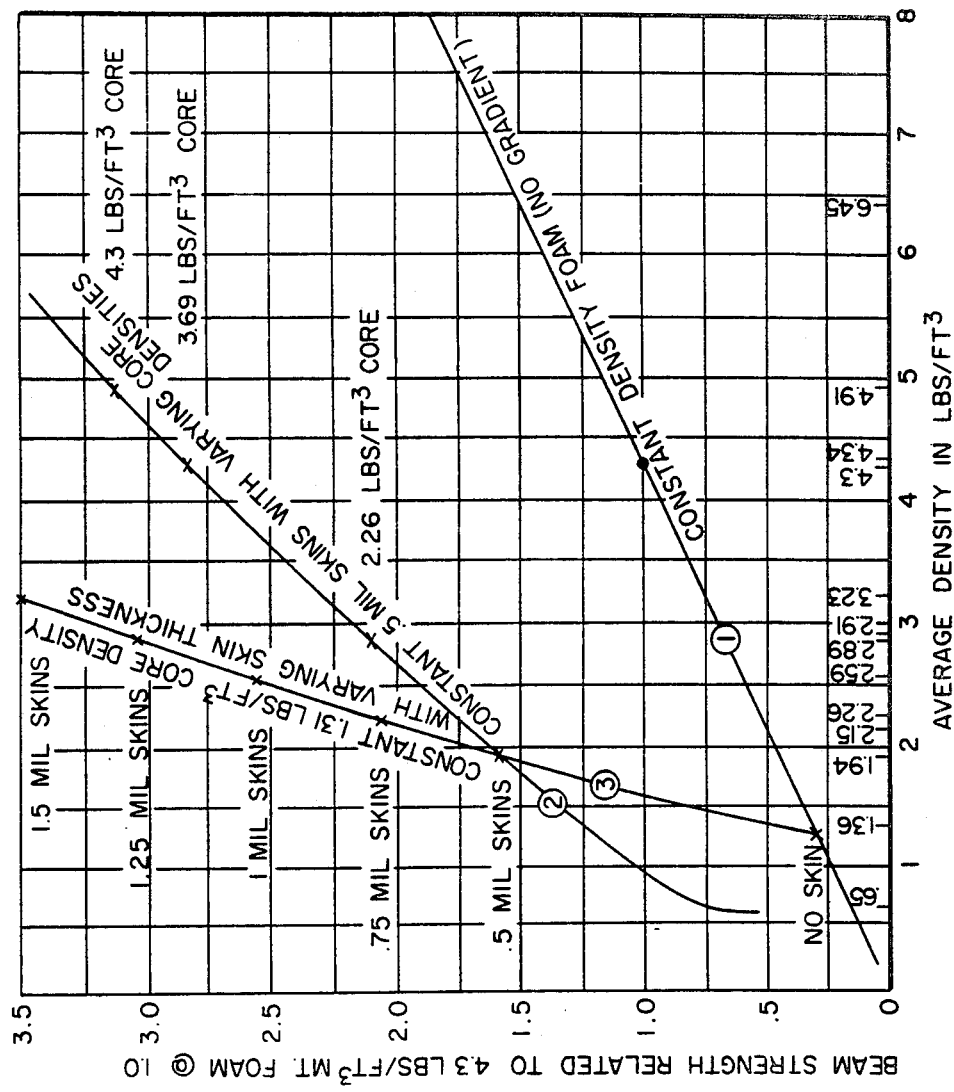
FIG. 1 represents a comparison of the strength of various members as a function of density.

FIG. 1 illustrates the average foam density decreases which may be achieved by the present method and system with not only no resulting loss in strength, but with in fact a strength increase. Strength in the curves is plotted against the average density of the polystyrene product. Curve 1 shows the strength characteristics of a constant density foam i.e. no density gradient through the polystyrene thickness. Curve 2 illustrates a polystyrene foam product of varying densities having a constant 0.5 mil high density skin on both sides of its core. Curve 3 shows the beam strength properties of a polystyrene foam product having a constant core density and varying skin thicknesses of high density. While curves 2 and 3 do not represent true gradients, they do approximate such gradients and illustrate the dramatic strength increase which may be produced by more closely matching density to stresses produced by bending the subject sheet product.

Examination of the curves shows that a foam gradient product having an average density of 2.6 lbs/ft$^3$ produces a beam strength 2.6 times as great as that of a product having a constant density of 4.3 lbs/ft$^3$. The process and apparatus of the present invention produces foam structures which have extremely high density skins and comparatively low density core layers. The economic importance of such a process and apparatus is clear. For example, polystyrene products may be produced which require less than half the amount of polystyrene presently used, yet which have greater strength properties. Production line speeds may be increased 100% without changing the amount of molten polystyrene flow through the extruder.

Figure 2:
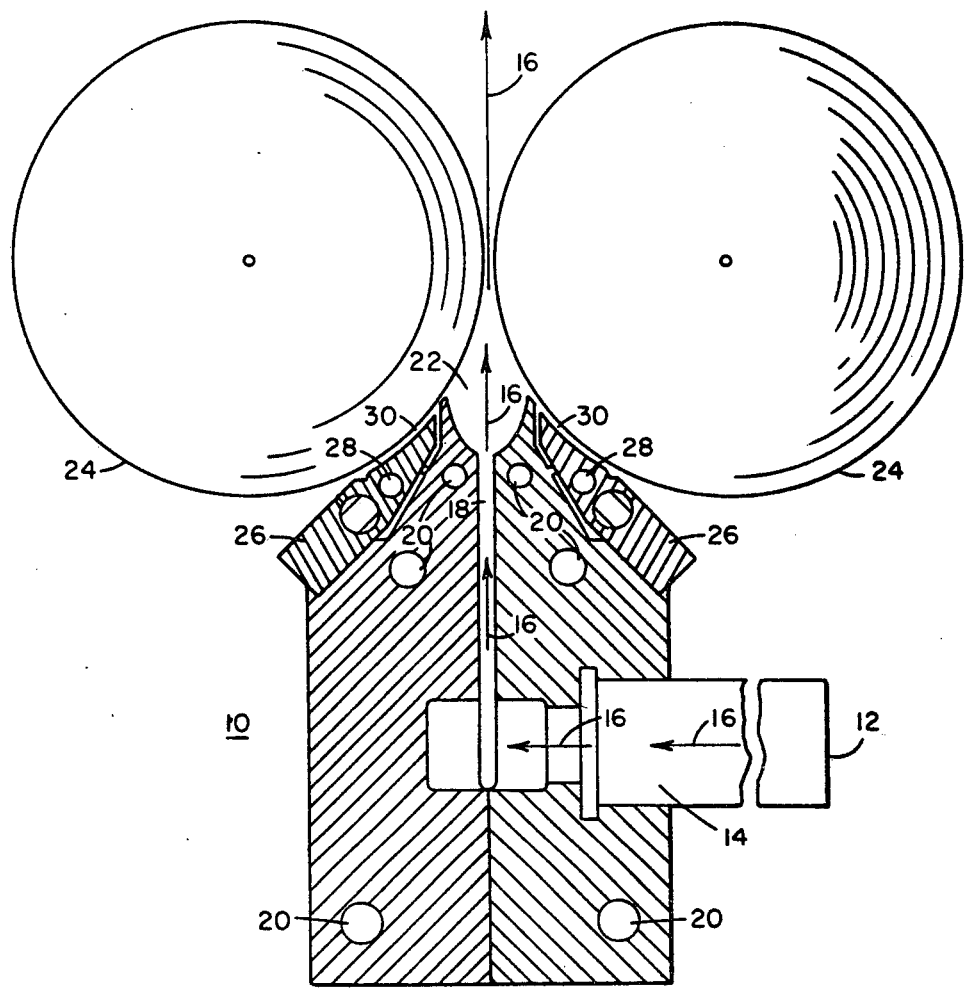
FIG. 2 represents a cross-sectional view of an apparatus adapted to perform the method of this invention.

FIG. 2 illustrates a system for forming the high strength polymer structure of the present invention. A polymer melt apparatus 12 is intended to represent any suitable apparatus that can process and mix, under pressure, a foamable polymer, a foaming agent system and any desired appropriate additive. Such suitable apparatus is described, e.g. in U.S. Pat. No. 3,482,006 and U.S. Pat. No. 4,344,710, the disclosures of which are incorporated herein in their entirety. The extrusion regions of these systems are replaced by the systems shown in FIG. 2 of the present invention.

Employing polystyrene or poly p-methylstyrene as an example of a suitable polymer and carbon dioxide as a suitable foaming agent, the mixture is brought to the molten state and thoroughly mixed in the extrusion system of choice. The molten mixture is then forced by pressure into the polymer melt inlet 14 along polymer path 16. The molten polymer mix is extruded through an extrusion slot 18. The length of the slot can be such as to extrude a sheet of any practical width, e.g. from inches to feet.

The molten polymer mix is maintained at the appropriate extrusion temperature by flowing heated fluid through passages 20. The mix is extruded into a post-extrusion region 22 and between, into contact with, and through driven chill rolls 24. During this process the molten mix fills the full volume of post-extrusion region 22 as a result of the back pressure created as the mix builds up in advance of the now-filled clearance between the driven chill rolls. The chill roll seals 26 fill the gross space between the extrusion slot lips and the chill rolls 35. These seals do not, however, make contact with the chill rolls 24. This is so that rubbing contact of the rolls is avoided. Cooling fluid in passages 28 chill the seals so that polystyrene, which fills the seal gaps 30, will solidify and thereby complete the seal without causing any substantial wear on the chill rolls as they rotate in contact with the polystyrene. Any suitable means to complete the seal at the end of the rolls and give integrity to the seal arrangement, closing post extrusion region 22, can be employed.

Figure 3:
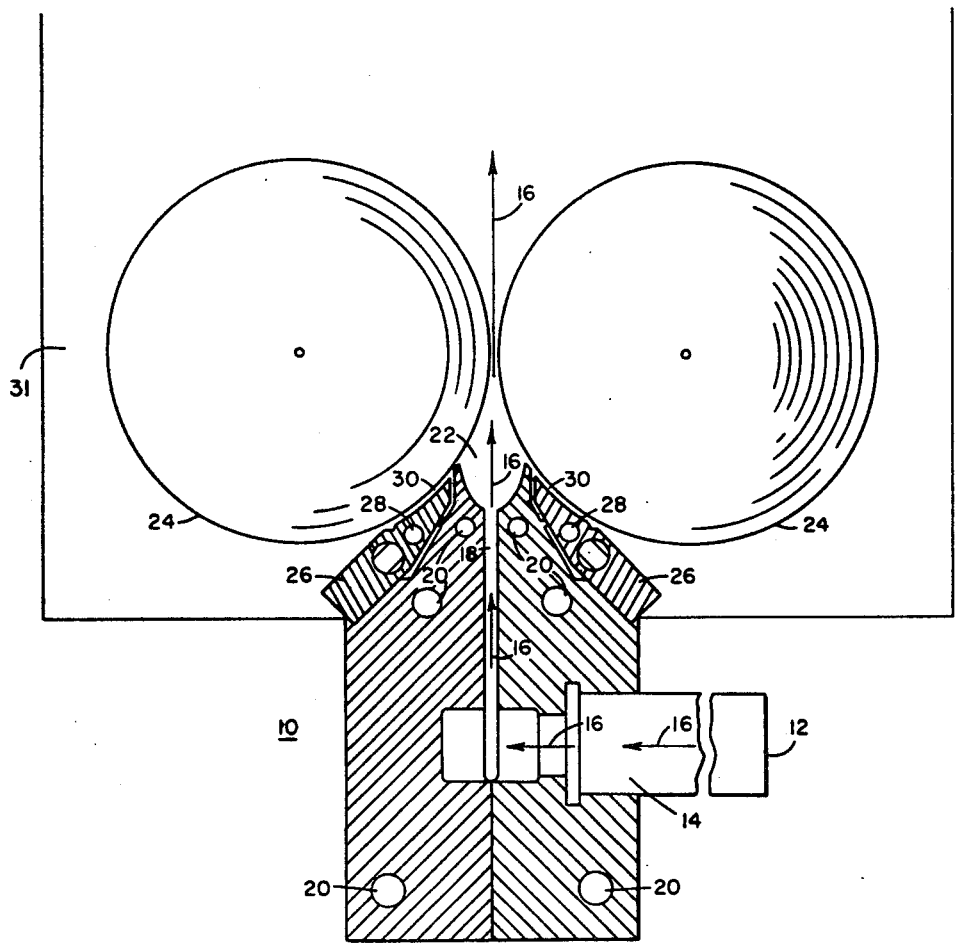
FIG. 3 represents the apparatus of FIG. 2 with the addition of an agueous bath.

The chill rolls should be maintained at an appropriate temperature below the solidification point of the molten polystyrene. This temperature and the rate of rotation of the driven chill rolls will determine the thickness of the skin layers. The chill rolls can be internally cooled with a suitable refrigerant e.g. water, which can make contact with the internal surface of the chill rolls and thus provide the appropriate chilling temperature. As shown in FIG. 3, a water bath 31 can be used in conjunction with the chill rolls into which the extruded polymer can pass after emanating from between the chill rolls. The water can be maintained in the region of the gap between the chill rolls, or as shown in the drawing, the bath 31 can extend completely around the chill rolls. In either case, the polymer structure will issue from between the driven chill rolls directly into the water bath. The use of a water bath also aids in maintaining the temperature of the chill rolls in control and in assuring a uniform high density skin on the low density core.

While the process and system of the present invention is applicable to a wide variety of thermoplastic resins, its effectiveness can be illustrated by the use of amorphous linear addition polymers of ethylenically-unsaturated monomers, such as styrene, p-methylstyrene, ethylene or other alpha-olefins, acrylics, etc. The preferred materials are styrenic homopolymers or interpolymers containing a predominate amount of styrene or substituted styrene. Commercially available polystyrene, such as Dow 685, or similar general purpose resins manufactured by Mobil Chemical Company and Foster Grant, can be employed in the present invention.

The blowing agents contemplated for use herein include all known blowing agents.

Preferred agents are low molecular weight aliphatic hydrocarbons, for example, the $C_1$–$C_{10}$ hydrocarbons, for example, methane, ethane, propane, butane, and -pentane, isopentane, hexane, heptane, cyclopentadiene, the Freons, etc. Particularly preferred is carbon dioxide when employed with polystyrene or poly p-methylstyrene.

It has been determined that with the present process and system the use of $CO_2$ will make a superior polystyrene structure. This is believed to be because $CO_2$ comes out of solution with the polystyrene as soon as it leaves the high pressure region of the die but before it is discharged from the slot die lips. This early separation characteristic should produce foam sheet with a lower density core than is possible with pentane. This feature makes an integral skin all but impossible except for the presently disclosed process because without it the surface would be foamed before cell formation can be inhibited by proper surface cooling.

To create a foam structure of the desired modulus requires a very low density core and an extremely dense skin on both surfaces. The low density core is easily attained with $CO_2$ but formation of the appropriate skin will require about 1500 psi to prevent foaming in this region. This high pressure is a normal condition prior to extrusion through the die and if this condition is maintained while the polymer is surface chilled the desired structure will be attained. Substantial skins can be obtained by the use of the driven chill rolls juxtipositioned to the slot die. These chill rolls in conjunction with appropriate seals maintain a back pressure in the post extrusion region and in the die and the surfaces of the extrudate can be chilled before surface foaming occurs. The chilled surfaces of this extrudate prevent it from expanding in the machine direction and in a transverse direction, but it is free to expand in thickness as it progresses through the space between the chill rolls. Thereafter, the sheet can be aged at an elevated temperature to drive off any skin $CO_2$. This process produces an unusual foam structure between the skins. The cells of the foam have their long axis at right angles to the skin layers. The cells appear to be somewhat tubular and oriented in the direction of the thickness of the sheet.

Employing the process and apparatus of the present invention, styrene polymer sheet formed employing carbon dioxide as the foaming agent, can be prepared having surface skins with a density ranging from about 55 to about 65 lbs per $ft^3$ with a core density ranging from about 1.3 to about 10 lbs per $ft^3$, said core representing from 50–97 percent of the thickness of the sheet.

What is claimed is:

1. A method for forming a polymeric sheet structure having comparatively high density skin layers and a comparatively low density core layer comprising:
   (a) extruding molten polymer containing a foaming agent therein through a slot die, into a post extrusion region defined by said die and two spaced rotating chill rolls which are spaced from said die;
   (b) maintaining said post extrusion region at a pressure sufficient to at least inhibit expansion of said formable molten polymer with cooled sealing means which occupy a substantial portion of the space between said die and said rolls and are spaced from said rolls, said rolls and said sealing means being cooled so that said foamble molten polymer in the space between said rolls and said sealing means is solidified;

(c) transporting said extruded foamable molten polymer between, and into contact with and through the chill rolls, the chill roll surfaces being maintained at a temperature lower than the solidification temperature of said polymer; and (d) transporting the foamable polymer from between said chill rolls to a region of lower pressure.

2. The process of claim 1 wherein said polymer is a polystyrene and said foaming agent is $CO_2$.

3. The process of claim 1 wherein said polymer is transported from between said rotating chill rolls into an aqueous bath maintained at below the solidification temperature of said polymer.

4. The process of claim 3, wherein said aqueous bath is a water bath which is in contact with at least the region between said chill rolls so that the polymer issues from between said rolls into said water bath.

5. Apparatus for producing a polymeric film structure having comparatively high density skin layers and a comparatively low density core layer comprising in combination:

(a) extruder means for transporting molten resin containing a foaming agent under pressure from a feed point to a slot die discharge point;

(b) a pair of spaced driven chill rolls in association with and spaced from said slot die and adapted to receive extruded molten foaming agent-containing polymer therebetween and into contact therewith;

(c) chill means for maintaining said chill rolls at a temperature below that of said foamable molten polymer; and (d) cooled sealing means between said die and said chill rolls, spaced from said chill rolls and occupying a substantial portion of the space between said die and said chill rolls, said rolls and said sealing means being cooled so that the foamable molten polymer in the space between said rolls and said sealing means is solidified to at least substantially pressure seal the region between said slot die and chill rolls and permit a back-pressure to develop therein.

6. The apparatus of claim 5 including bath means for maintaining at least the region between said chill rolls in contact with water maintained at a temperature below the soldification temperature of said extruded foamable polymer so that the polymer issues from between said rolls into the water.

* * * * *

UNITED STATES PATENT AND TRADEMARK OFFICE
CERTIFICATE OF CORRECTION

PATENT NO. : 4,456,571
DATED : June 26, 1984
INVENTOR(S) : DAVID E. JOHNSON

It is certified that error appears in the above-identified patent and that said Letters Patent is hereby corrected as shown below:

Col. 3, line 29, "chill rolls 35" should read --chill rolls 24--.

Col. 4, line 66, "formable" should read --foamable--.

Signed and Sealed this

Fifteenth Day of January 1985

[SEAL]

Attest:

GERALD J. MOSSINGHOFF

Attesting Officer   Commissioner of Patents and Trademarks